United States Patent
Amitai

(10) Patent No.: US 7,724,443 B2
(45) Date of Patent: May 25, 2010

(54) SUBSTRATE-GUIDED OPTICAL DEVICE UTILIZING THIN TRANSPARENT LAYER

(75) Inventor: Yaakov Amitai, Rehovot (IL)

(73) Assignee: Lumus Ltd., Rehovot (IL)

( * ) Notice: Subject to any disclaimer, the term of this patent is extended or adjusted under 35 U.S.C. 154(b) by 367 days.

(21) Appl. No.: 11/815,547

(22) PCT Filed: Feb. 8, 2006

(86) PCT No.: PCT/IL2006/000157

§ 371 (c)(1),
(2), (4) Date: Aug. 3, 2007

(87) PCT Pub. No.: WO2006/085309

PCT Pub. Date: Aug. 17, 2006

(65) Prior Publication Data

US 2009/0122414 A1    May 14, 2009

(30) Foreign Application Priority Data

Feb. 10, 2005  (IL) .................................. 166799
Jan. 31, 2006  (IL) .................................. 173451

(51) Int. Cl.
*G02B 27/14* (2006.01)
*G02B 5/30* (2006.01)
*G02B 6/00* (2006.01)

(52) U.S. Cl. ................... 359/633; 359/629; 359/486; 385/133

(58) Field of Classification Search ............ 359/633, 359/629, 630, 486; 385/129–133, 146
See application file for complete search history.

(56) References Cited

U.S. PATENT DOCUMENTS 5,076,664 A    12/1991  Migozzi
6,349,001 B1    2/2002  Spitzer

FOREIGN PATENT DOCUMENTS

| EP | 0 399 865 A1 | 11/1990 |
| EP | 0 566 004 A2 | 10/1993 |
| EP | 1 385 023 A1 | 1/2004 |
| WO | WO 01/95027 A2 | 12/2001 |
| WO | WO 03/081320 A1 | 10/2003 |
| WO | WO 2004/109349 A2 | 12/2004 |

*Primary Examiner*—Jack Dinh

(57) ABSTRACT

There is provided an optical device, including a light-transmitting substrate having two major surfaces and edges, an optical element (16) for coupling light waves into the substrate by total internal reflexion, and a plurality of partially reflecting surfaces (22a, 22b, 22c) carried by the substrate. The partially reflecting surfaces are parallel to each other and are not parallel to any of the edges of the substrate. At least one of the partially reflecting surfaces (22a, 22b, 22c) does not intersect with at least one of the two major surfaces, and the optical element (16) intersects with at least one of the two major surfaces.

26 Claims, 10 Drawing Sheets

SUBSTRATE-GUIDED OPTICAL DEVICE UTILIZING THIN TRANSPARENT LAYER

FIELD OF THE INVENTION

The present invention relates to substrate-guided optical devices, and particularly to devices which include a plurality of reflecting surfaces carried by a common light-transmissive substrate, also referred to as a light wave-guide optical element (LOE).

The invention can be implemented to advantage in a large number of imaging applications, such as, for example, head-mounted and head-up displays, cellular phones, compact displays, 3-D displays, compact beam expanders as well as non-imaging applications such as flat-panel indicators, compact illuminators and scanners.

BACKGROUND OF THE INVENTION

One of the important applications for compact optical elements is in head-mounted displays wherein an optical module serves both as an imaging lens and a combiner, in which a two-dimensional display is imaged to infinity and reflected into the eye of an observer. The display can be obtained directly from either a spatial light modulator (SLM) such as a cathode ray tube (CRT), a liquid crystal display (LCD), an organic light emitting diode array (OLED), or a scanning source and similar devices, or indirectly, by means of a relay lens or an optical fiber bundle. The display comprises an array of elements (pixels) imaged to infinity by a collimating lens and transmitted into the eye of the viewer by means of a reflecting or partially reflecting surface acting as a combiner for non-see-through and see-through applications, respectively. Typically, a conventional, free-space optical module is used for these purposes. Unfortunately, as the desired field-of-view (FOV) of the system increases, such a conventional optical module becomes larger, heavier, bulkier and therefore, even for a moderate performance device, impractical. This is a major drawback for all kinds of displays but especially in head-mounted applications, wherein the system must necessarily be as light and as compact as possible.

The strive for compactness has led to several different complex optical solutions, all of which, on one hand, are still not sufficiently compact for most practical applications, and, on the other hand, suffer major drawbacks in terms of manufacturability. Furthermore, the eye-motion-box of the optical viewing angles resulting from these designs is usually very small—typically less than 8 mm. Hence, the performance of the optical system is very sensitive, even to small movements of the optical system relative to the eye of the viewer, and do not allow sufficient pupil motion for conveniently reading text from such displays.

DISCLOSURE OF THE INVENTION

The present invention facilitates the design and fabrication of very compact LOE for, amongst other applications, head-mounted displays. The invention allows relatively wide FOVs together with relatively large eye-motion-box values. The resulting optical system offers a large, high-quality image, which also accommodates large movements of the eye. The optical system offered by the present invention is particularly advantageous because it is substantially more compact than state-of-the-art implementations and yet it can be readily incorporated, even into optical systems having specialized configurations.

The invention also enables the construction of improved head-up displays (HUDs). Since the inception of such displays more than three decades ago, there has been significant progress in the field. Indeed, HUDs have become popular and they now play an important role, not only in most modern combat aircraft, but also in civilian aircraft, in which HUD systems have become a key component for low-visibility landing operation. Furthermore, there have recently been numerous proposals and designs for HUDs in automotive applications where they can potentially assist the driver in driving and navigation tasks. Nevertheless, state-of-the-art HUDs suffer several significant drawbacks. All HUDs of the current designs require a display source that must be offset a significant distance from the combiner to ensure that the source illuminates the entire combiner surface. As a result, the combiner-projector HUD system is necessarily bulky, and large, and requires considerable installation space, which makes it inconvenient for installation and at times even unsafe to use. The large optical aperture of conventional HUDs also poses a significant optical design challenge, either rendering the HUDs with compromising performance, or leading to high cost wherever high-performance is required. The chromatic dispersion of high-quality holographic HUDs is of particular concern.

An important application of the present invention relates to its implementation in a compact HUD, which alleviates the aforementioned drawbacks. In the HUD design of the current invention, the combiner is illuminated with a compact display source that can be attached to the substrate. Hence, the overall system is very compact and can be readily installed in a variety of configurations for a wide range of applications. In addition, the chromatic dispersion of the display is negligible and, as such, can operate with wide spectral sources, including a conventional white-light source. In addition, the present invention expands the image so that the active area of the combiner can be much larger than the area that is actually illuminated by the light source.

A further application of the present invention is to provide a compact display with a wide FOV for mobile, hand-held application such as cellular phones. In today's wireless internet-access market, sufficient bandwidth is available for full video transmission. The limiting factor remains the quality of the display within the device of the end-user. The mobility requirement restricts the physical size of the displays, and the result is a direct-display with poor image viewing quality. The present invention enables a physically very compact display with a very large virtual image. This is a key feature in mobile communications, and especially for mobile internet access, solving one of the main limitations for its practical implementation. Thereby the present invention enables the viewing of the digital content of a full format internet page within a small, hand-held device, such as a cellular phone.

A broad object of the present invention is therefore to alleviate the drawbacks of state-of-the-art compact optical display devices and to provide other optical components and systems having improved performance, according to specific requirements.

In accordance with the present invention there is therefore provided an optical device, comprising a light-transmitting substrate having at least two major surfaces and edges, optical means for coupling light waves into said substrate by total internal reflection, and a plurality of partially reflecting surfaces carried by said substrate, wherein said partially reflecting surfaces are parallel to each other and are not parallel to any of the edges of said substrate, characterized in that at least one of said partially reflecting surfaces does not intersect with at least one of said two major surfaces.

The invention further provides an optical device, comprising a first light-transmitting substrate having at least a first and a second major surface and edges, optical means for coupling light into said substrate by total internal reflection, and a plurality of partially reflecting surfaces carried by said first substrate wherein said partially reflecting surfaces are parallel to each other and are not parallel to any of the edges of said substrate, characterized in that all of said partially reflecting surfaces intersect with said first and second major surfaces, and wherein said optical means intersects with at least one of said first or second major surfaces, further comprising a light transmitting plate having at least two major surfaces, wherein one of said major surfaces is attached to one of the first or second major surfaces of said first substrate.

BRIEF DESCRIPTION OF THE DRAWINGS

The invention is described in connection with certain preferred embodiments, with reference to the following illustrative figures so that it may be more fully understood.

With specific reference to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings are to serve as direction to those skilled in the art as to how the several forms of the invention may be embodied in practice.

In the drawings:

FIG. 1 is a side view of a generic form of a prior art folding optical device;

FIG. 2 is a side view of an exemplary light-guide optical element;

FIGS. 3A and 3B illustrate the desired reflectance and transmittance characteristics of selectively reflecting surfaces used in the present invention for two ranges of incident angles;

FIG. 4 is a diagram illustrating a detailed sectional view of an exemplary array of selectively reflective surfaces;

FIG. 5 illustrates the reflectance and the transmittance performance of an anisotropic reflecting surface which is oriented to reflect s-polarized light;

FIG. 6 illustrates the reflectance and the transmittance performance of an anisotropic reflecting surface which is oriented to reflect p-polarized light;

FIG. 7 illustrates another detailed sectional view of an exemplary array of selectively reflective surfaces;

FIG. 8 is a schematic sectional-view of a reflective surface according to the present invention;

FIGS. 9A and 9B are diagrams illustrating detailed sectional views of an exemplary array of selectively reflective surfaces;

FIG. 10 is a schematic sectional-view of a reflective surface with two different impinging rays according to the present invention;

FIG. 11 illustrates a sectional view of an exemplary array of selectively reflective surfaces wherein a blank plate is attached to the substrate edge;

Figure 12:
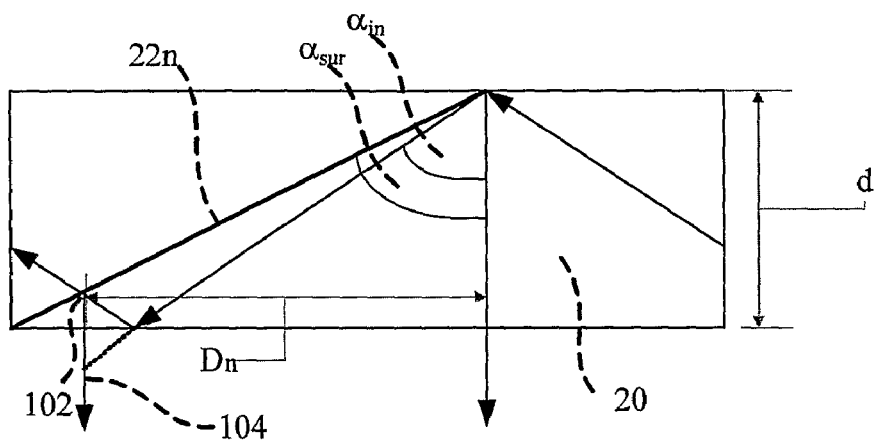
Figure 13:
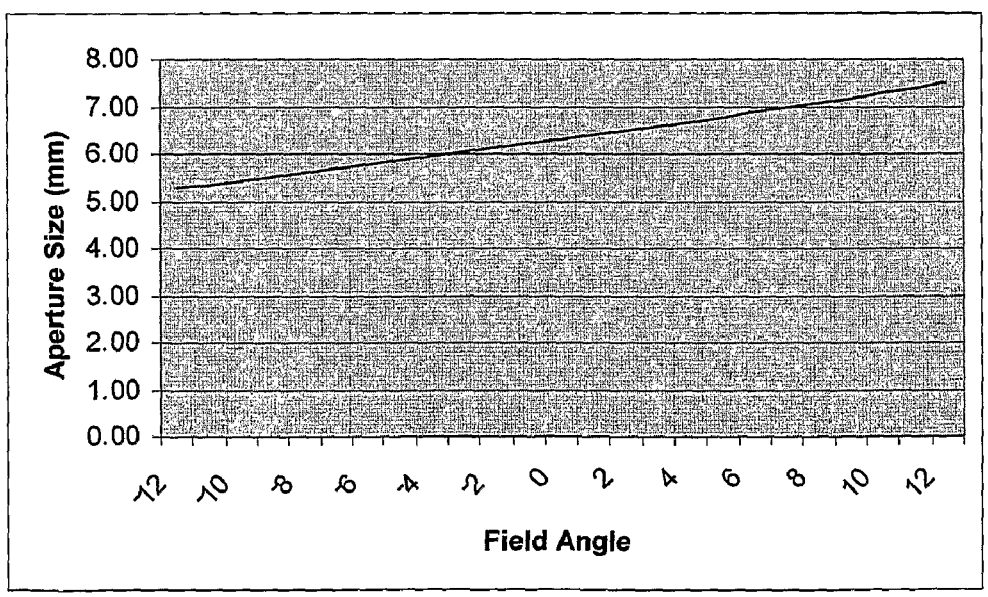
Figure 14:
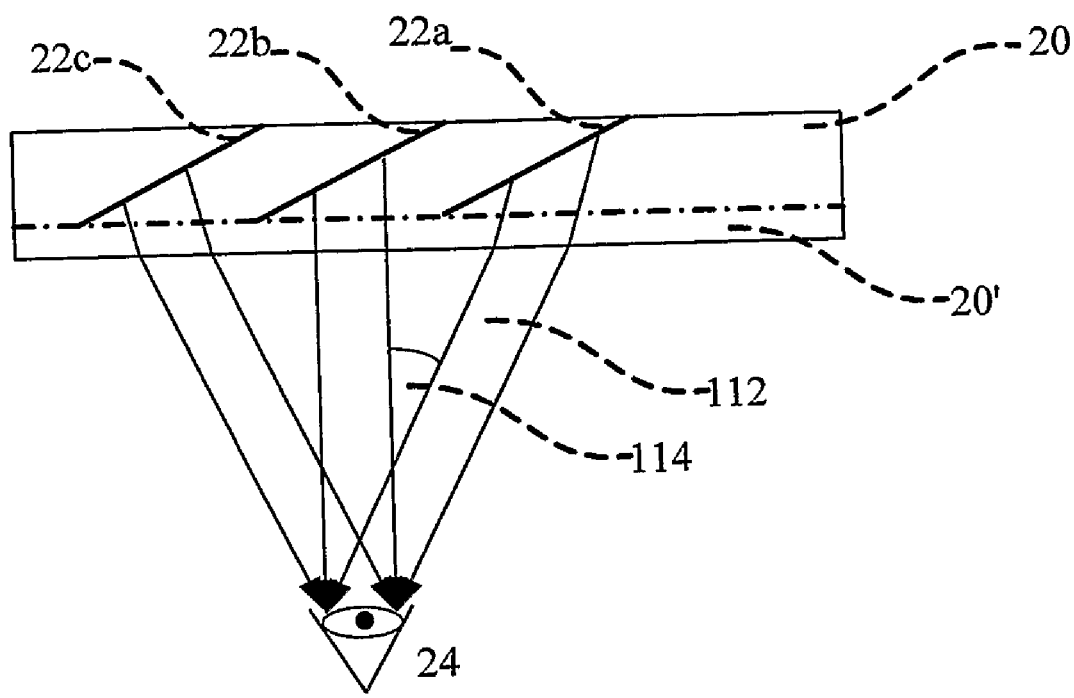
Figure 15:
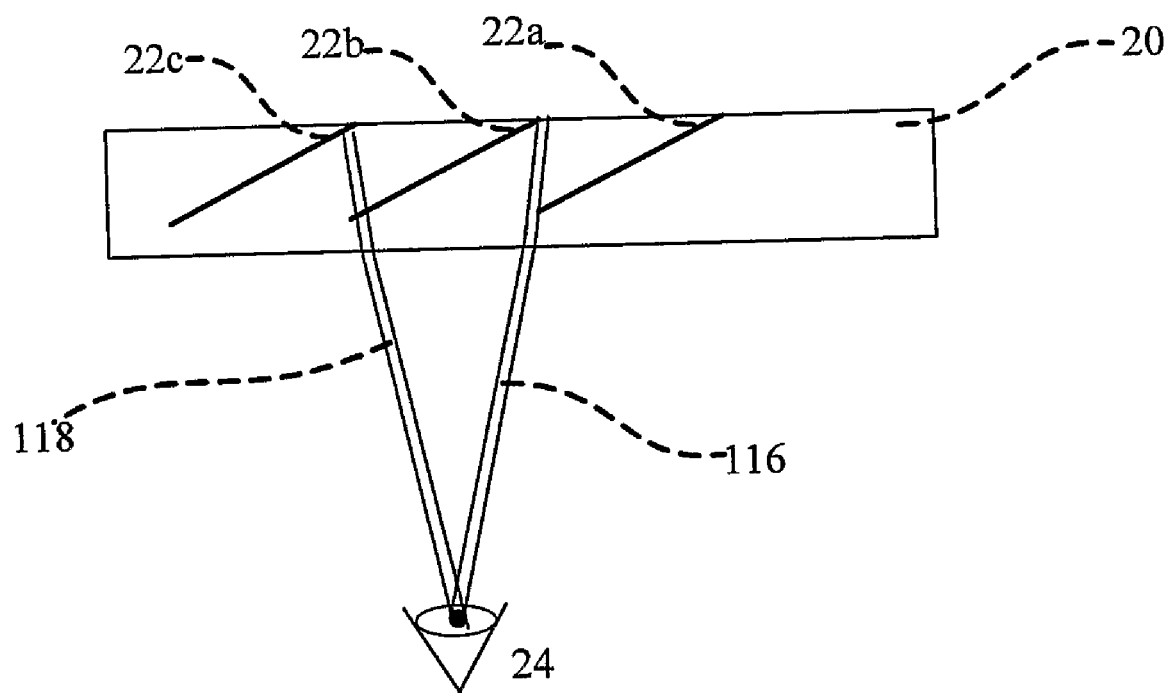
Figure 16:
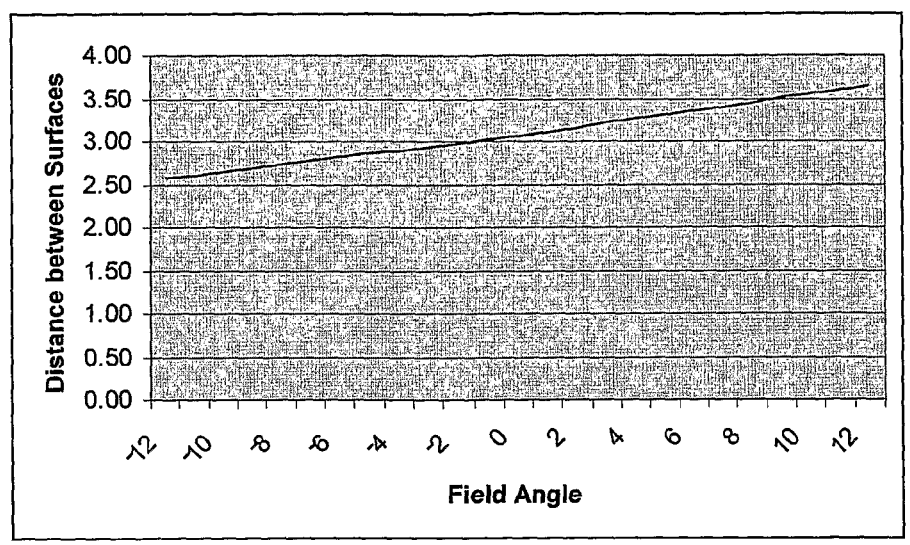
Figure 17:
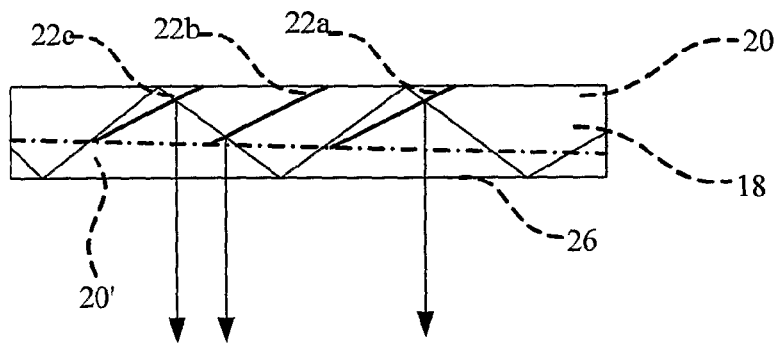
Figure 18:
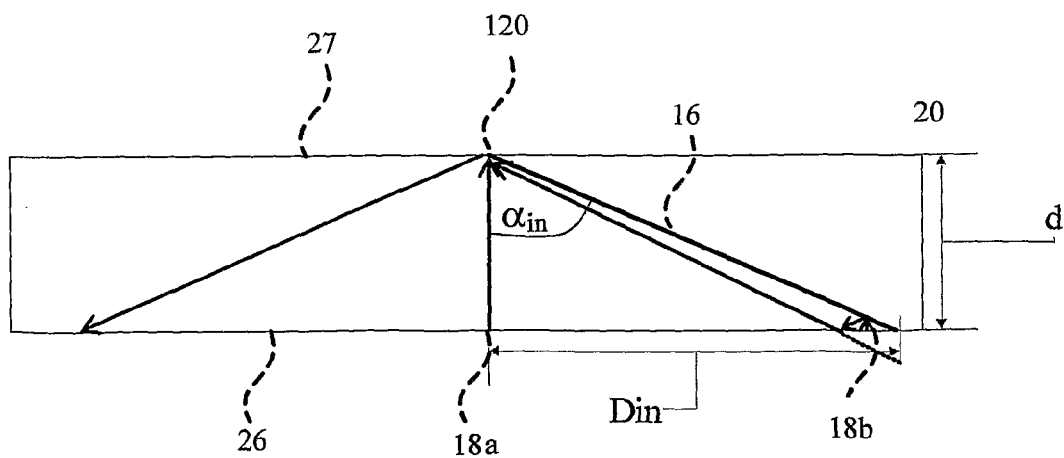
Figure 19:
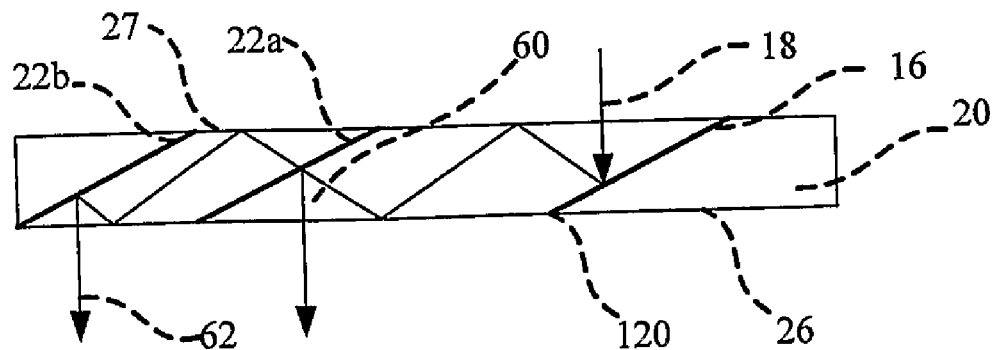
Figure 20:
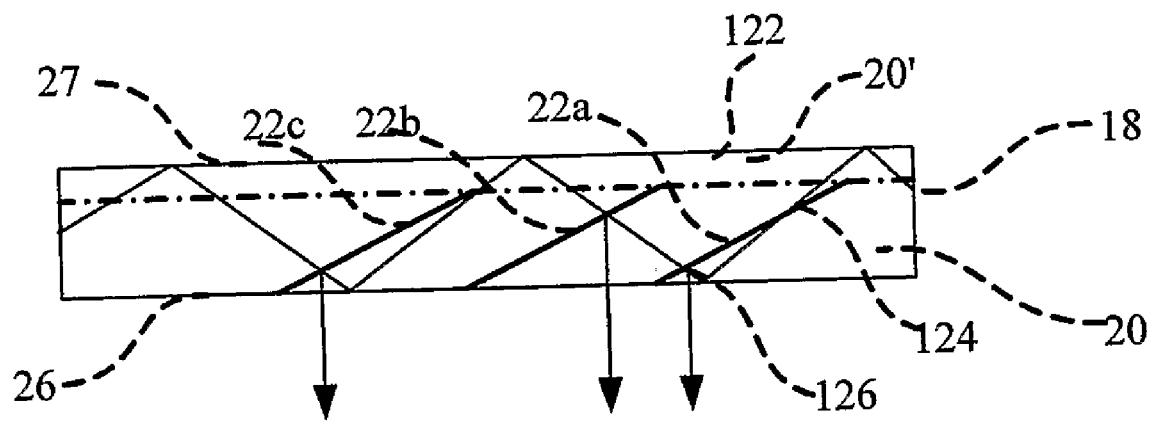
Figure 21:
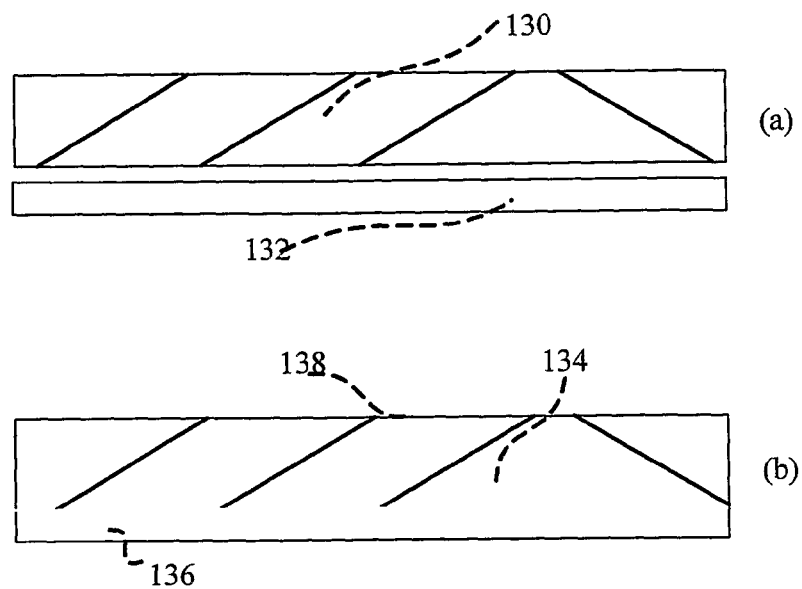
Figure 22:
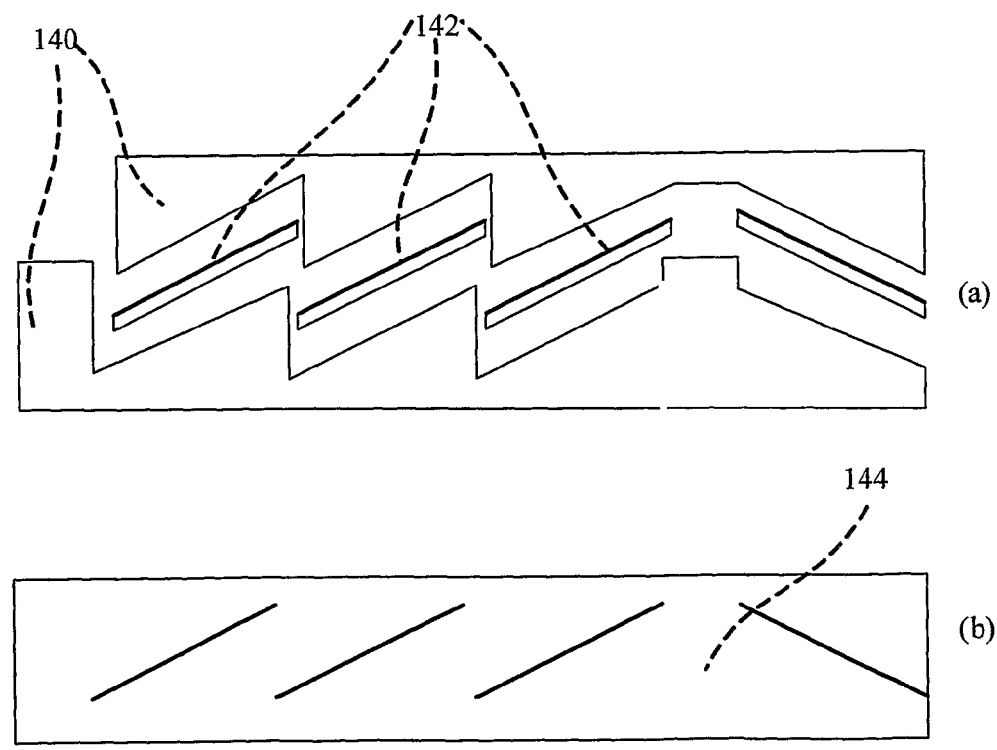
Figure 23:
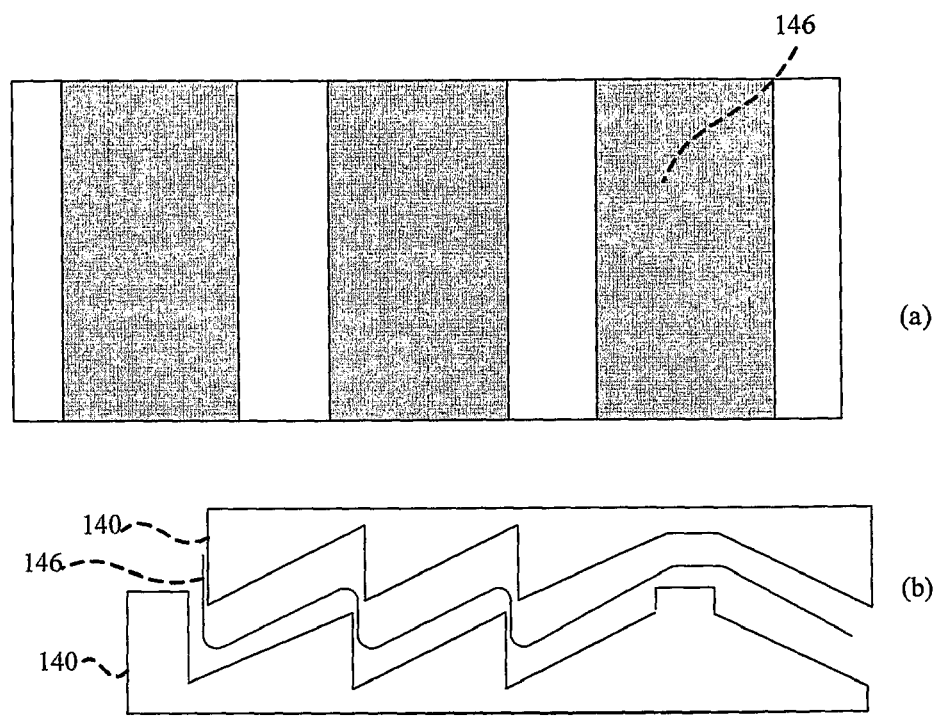
Figure 24:
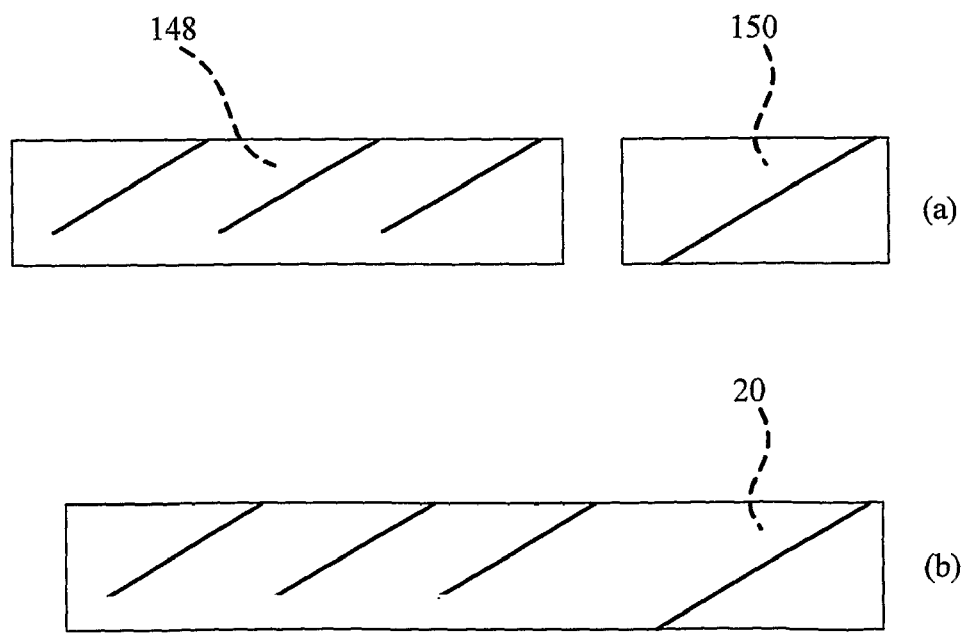

FIG. 12 illustrates the active aperture size of the reflecting surfaces as a function of the field angle for an exemplary LOE;

FIG. 13 is a schematic sectional-view of a reflective surface according to the present invention illustrating the actual active aperture of the surface;

FIG. 14 illustrates detailed sectional views of the reflectance from an exemplary array of selectively reflective surfaces, for three different viewing angles;

FIG. 15 illustrates detailed sectional views of the reflectance from an exemplary array of selectively reflective surfaces, for two different viewing angles;

FIG. 16 illustrates the required distance between two adjacent reflecting surfaces as a function of the field angle for an exemplary LOE;

FIG. 17 illustrates a sectional view of an exemplary array of selectively reflective surfaces wherein a wedged blank plate is attached to the substrate edge;

FIG. 18 is a schematic sectional-view of a reflective surface embedded inside a light-guide optical element;

FIG. 19 illustrates another detailed sectional view of an exemplary array of selectively reflective surfaces wherein the input surface is opposite the output surface;

FIG. 20 illustrates a sectional view of an exemplary array of selectively reflective surfaces wherein a blank plate is attached to the upper substrate edge;

FIG. 21 is a diagram illustrating steps (a) and (b) of a method to attach a blank plate at the edge of the LOE;

FIG. 22 is a diagram illustrating steps (a) and (b) of a method for fabricating an array of partially reflecting surfaces according to the present invention;

FIG. 23 is a diagram illustrating steps (a) and (b) of a further method for fabricating an array of partially reflecting surfaces according to the present invention, and FIG. 24 is a diagram illustrating steps (a) and (b) of a method for fabricating an array of partially reflecting surfaces along with a coupling-in reflecting surface according to the present invention.

DETAILED DESCRIPTION OF PREFERRED EMBODIMENTS

Figure 1:
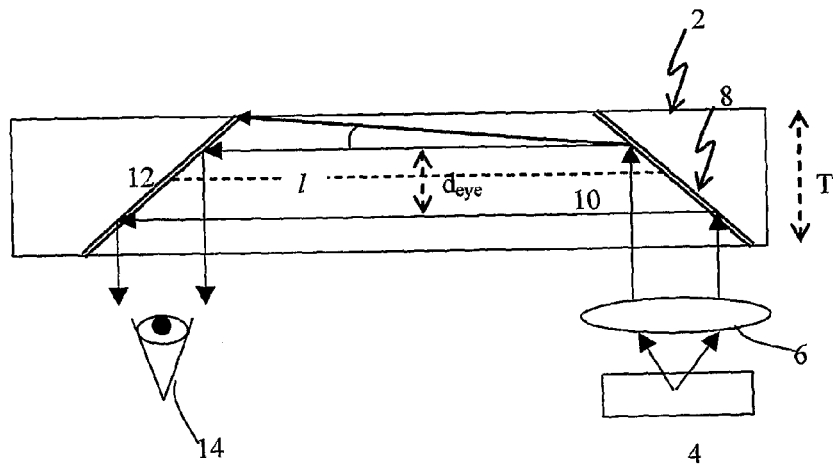

FIG. 1 illustrates a prior art folding optics arrangement, wherein the substrate 2 is illuminated by a display source 4. The display is collimated by a collimating lens 6. The light from the display source 4 is coupled into substrate 2 by a first reflecting surface 8, in such a way that the main ray 10 is parallel to the substrate plane. A second reflecting surface 12 couples the light out of the substrate and into the eye 14 of a viewer. Despite the compactness of this configuration, it suffers significant drawbacks; in particular only a very limited FOV can be affected. As shown in FIG. 1, the maximum allowed off-axis angle inside the substrate is:

$$\alpha_{max} = \arctan\left(\frac{T - d_{eye}}{2l}\right), \quad (1)$$

wherein T is the substrate thickness;

$d_{eye}$ is the desired exit-pupil diameter, and l is the distance between reflecting surfaces 8 and 12.

With angles higher than $\alpha_{max}$ the rays are reflected from the substrate surface before arriving at the reflecting surface 12. Hence, the reflecting surface 12 will be illuminated at an undesired direction and ghost images will appear.

Therefore, the maximum achievable FOV with this configuration is:

$$FOV_{max} \approx 2\nu\, \alpha_{max}, \quad (2)$$

wherein ν is the refractive index of the substrate.

Typically the refractive index values lie in the range of 1.5-1.6.

Commonly, the diameter of the eye pupil is 2-6 mm. To accommodate movement or misalignment of the display, a larger exit-pupil diameter is necessary. Taking the minimum desirable value at approximately 8-10 mm, the distance between the optical axis of the eye and the side of the head, l, is, typically, between 40 and 80 mm. Consequently, even for a small FOV of 8°, the desired substrate thickness would be of the order of 12 mm.

Methods have been proposed to overcome the above problem. These include utilizing a magnifying telescope inside the substrate and non-parallel coupling directions. Even with these solutions however, and even if only one reflecting surface is considered, the system thickness remains limited by a similar value. The FOV is limited by the diameter of the projection of the reflective surface 12 on the substrate plane. Mathematically, the maximum achievable FOV, due to this limitation, is expressed as:

$$FOV_{max} \approx \frac{T \tan\alpha_{sur} - d_{eye}}{R_{eye}}, \quad (3)$$

wherein, $\alpha_{sur}$, is the angle between the reflecting surface and the normal to the substrate plane, and $R_{eye}$, is the distance between the eye of the viewer and the substrate (typically, about 30-40 mm).

In practice, $\tan \alpha_{sur}$ cannot be much larger than 1; hence, for the same parameters described above for a FOV of 8°, the required substrate thickness here is of the order of 7 mm, which is an improvement on the previous limit. Nevertheless, as the desired FOV is increased, the substrate thickness increases rapidly. For instance, for desired FOVs of 15° and 30° the substrate limiting thickness is 18 mm and 25 mm, respectively.

Figure 2:
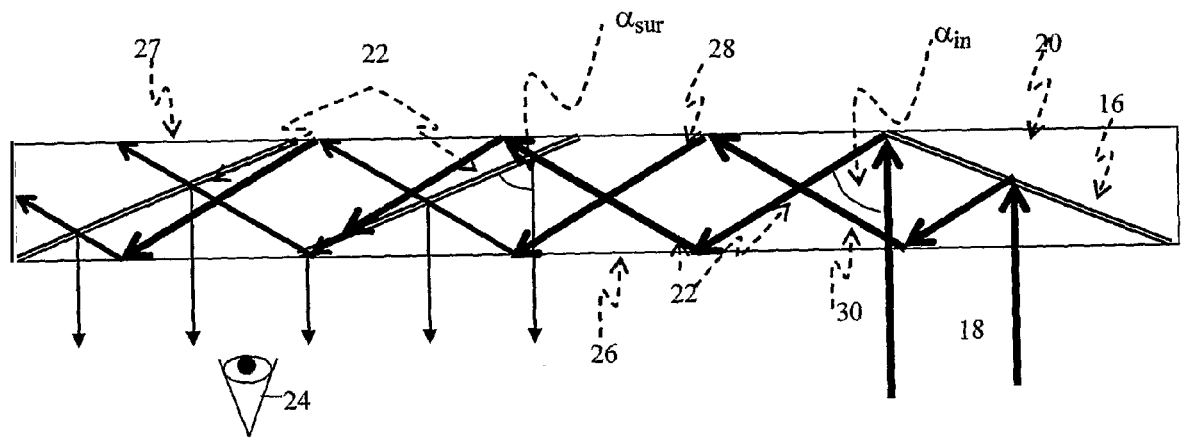

To alleviate the above limitations, the present invention utilizes an array of selectively reflecting surfaces, fabricated within a LOE. FIG. 2 illustrates a sectional view of an LOE according to the present invention. The first reflecting surface 16 is illuminated by a collimated display 18 emanating from a light source (not shown) located behind the device. The reflecting surface 16 reflects the incident light from the source such that the light is trapped inside a planar substrate 20 by total internal reflection. After several reflections off the surfaces of the substrate, the trapped light waves reach an array of selectively reflecting surfaces 22, which couple the light out of the substrate into the eye 24 of a viewer. Herein, the input surface of the LOE will be defined as the surface through which the input light waves enter the LOE and the output surface of the LOE will be defined as the surface through which the trapped light waves exit the LOE. In the case of the LOE illustrated in FIG. 2, both the input and the output surfaces coincide with the lower surface 26. However, other configurations are envisioned in which the input and the image light waves could be located on opposite sides of the substrate. Assuming that the central light wave of the source is coupled out of the substrate 20 in a direction normal to the substrate surface 26, the reflecting surfaces 22 are flat, and the off-axis angle of the coupled light wave inside the substrate 20 is $\alpha_{in}$, then the angle $\alpha_{sur2}$ between the reflecting surfaces and the normal to the substrate plane is:

$$\alpha_{sur2} = \frac{\alpha_{in}}{2}. \quad (4)$$

As can be seen in FIG. 2, the trapped rays arrive at the reflecting surfaces from two distinct directions 28, 30. In this particular embodiment, the trapped rays arrive at the reflecting surface from one of these directions 28 after an even number of reflections from the substrate surfaces 26 and 27, wherein the incident angle $\beta_{ref}$ between the trapped ray and the normal to the reflecting surface is:

$$\beta_{ref} = 90° - (\alpha_{in} - \alpha_{sur2}) = 90° - \frac{\alpha_{in}}{2}. \quad (5)$$

The trapped rays arrive at the reflecting surface from the second direction 30 after an odd number of reflections from the substrate surfaces 26 and 27, where the off-axis angle is $\alpha'_{in} = 180° - \alpha_{in}$ and the incident angle between the trapped ray and the normal to the reflecting surface is:

$$\begin{aligned}\beta'_{ref} &= 90° - (\alpha'_{in} - \alpha_{sur2}) \\ &= 90° - (180° - \alpha_{in} - \alpha_{sur2}) \\ &= -90° + \frac{3\alpha_{in}}{2}. \end{aligned} \quad (6)$$

As illustrated in FIG. 2, for each reflecting surface, each ray first arrives at the surface from the direction 30, wherein some of the rays impinge on the surface again, from direction 28. In order to prevent undesired reflections and ghost images, it is important that the reflectance be negligible for the rays that impinge on the surface having the second direction 28.

Two solutions to this requirement were previously proposed. The first exploits the angular sensitivity of thin film coatings. The desired discrimination between the two incident directions can be achieved if one angle is significantly smaller than the other one. It is possible to provide a coating with very low reflectance at high incident angles and a high reflectance for low incident angles. This property can be exploited to prevent undesired reflections and ghost images by eliminating the reflectance in one of the two directions. For example, choosing $\beta_{ref}$~25° from Equations (5) and (6), it can be calculated that:

$$\beta'_{ref}=105°;\; \alpha_{in}=50°;\; \alpha'_{in}=130°;\; \alpha_{sur2}=25°. \quad (7)$$

Figures 3A, 3B:
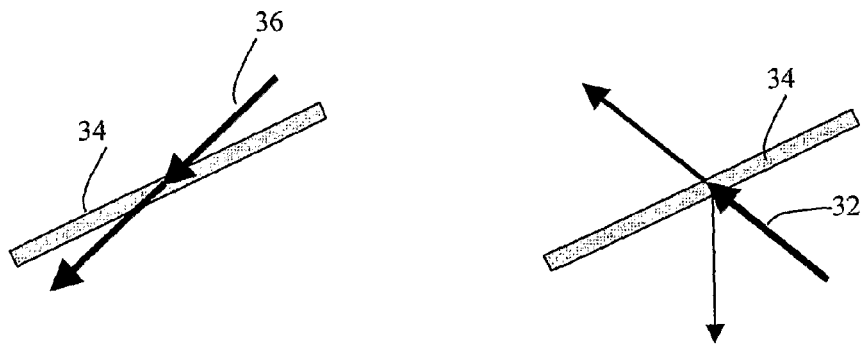

If a reflecting surface is now determined for which $\beta'_{ref}$ is not reflected but $\beta_{ref}$ is, then the desired condition is achieved. FIGS. 3A and 3B illustrate the desired reflectance behavior of selectively reflecting surfaces. While the ray 32 (FIG. 3A), having an off-axis angle of $\beta_{ref}$~25°, is partially reflected and is coupled out of the substrate 34, the ray 36 (FIG. 3B), which arrives at an off-axis angle of $\beta'_{ref}$~75° to the reflecting surface (which is equivalent to $\beta'_{ref}$~105°), is transmitted through the reflecting surface 34 without any notable reflection.

Figure 4:
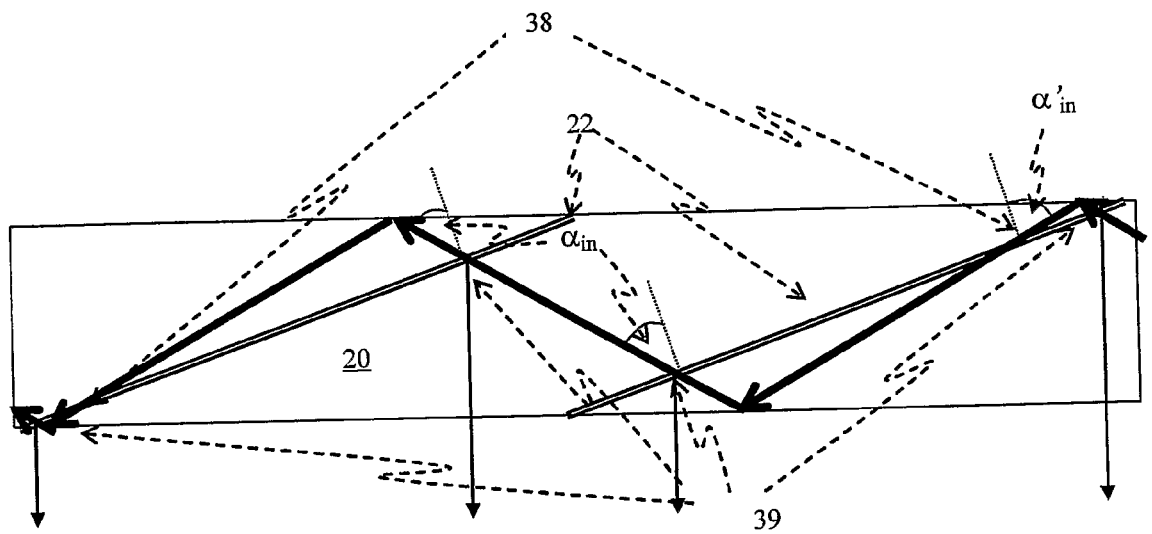

FIG. 4 is a detailed sectional view of an array of selectively reflective surfaces which couple light trapped inside the substrate out and into the eye of a viewer. As can be seen, in each cycle, the coupled ray passes through reflecting surfaces 38, having a direction of $\alpha'_{in}=130°$, whereby the angle between the ray and the normal to the reflecting surfaces is ~75° and the reflections from these surfaces are negligible. In addition, in each cycle the ray passes through the reflecting surface 39 twice in a direction of $\alpha_{in}=50°$, where the incident angle is 25° and part of the energy of the ray is coupled out of the substrate.

An alternative solution utilizes anisotropic reflecting surfaces, that is, optical surfaces having a major axis parallel to the surface plane wherein the reflection and transmission properties of the surface depend strongly in the orientation of the polarization of the incident light in relation to the major axis of the surface. The desired discrimination between the two incident directions can be achieved by exploiting the fact that the undesired direction meets the surface after the ray has transferred the surface in the desired direction.

Figure 5:
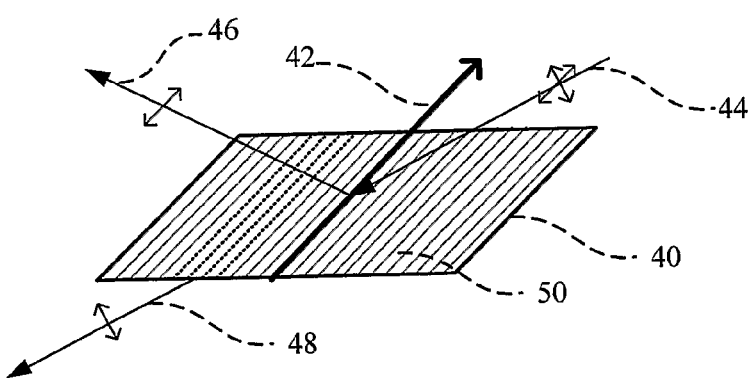

FIG. 5 illustrates an example of an anisotropic partially reflecting surface 40 having a major axis 42. An unpolarized light wave 44 impinges on the surface. The partially reflecting surface reflects the component of the light 46 with its electrical field vector parallel to the major axis 42 and transmits the component of the light 48 with its electrical field vector perpendicular to the major axis 42.

Figure 6:
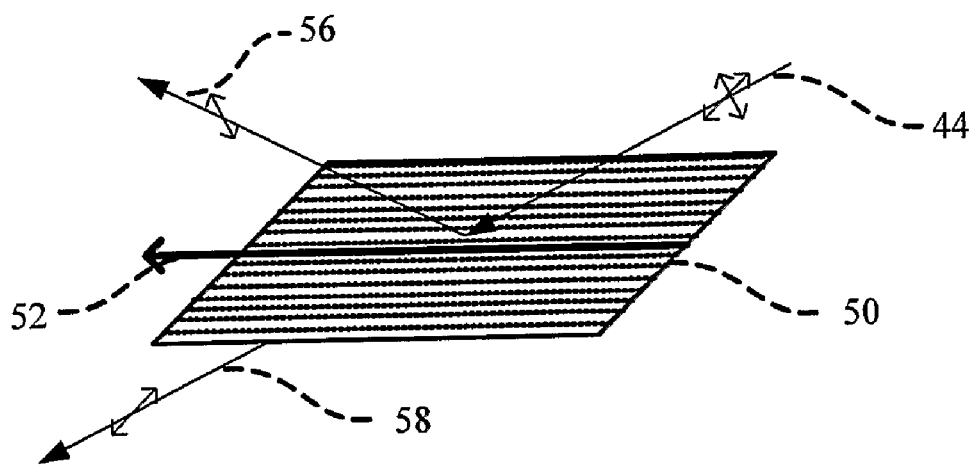

A possible candidate for the required anisotropic partially reflecting element can be a wire grid polarizing beamsplitter 50, generally in the form of an array of thin parallel conductors supported by a transparent substrate. The key factor that determines the performance of a wire grid polarizing beamsplitter 50 is the relationship between the center-to-center spacing, or period, of the parallel grid elements and the wavelength of the incident radiation. When the grid spacing or period is much shorter than the wavelength, the grid functions as a polarizing beamsplitter 50 that reflects electromagnetic radiation polarized parallel to the grid elements, and transmits radiation of the orthogonal polarization. In this case, the major axis of a wire grid polarizing beamsplitter 50 is defined as parallel to the array of conductors. Usually, in order to obtain the best transmission and contrast, the wire grid polarizing beamsplitter should be used to transmit the p-polarization and reflect the s-polarization, as illustrated in FIG. 5. It is, however, also possible to use the beamsplitter in the orthogonal orientation, illustrated in FIG. 6, i.e., the main axis 52 of the polarizing beamsplitter 50 is oriented parallel to the propagation direction of the incident beam 44. Since now the major axis of the polarizing beamsplitter 50 is parallel to the electric field of the p-polarized light, the polarizing beamsplitter 50 reflects the component of the p-polarized light 56 with its electrical field vector parallel to the major axis 52 and transmits the component of the s-polarized light 58 with its electrical field vector perpendicular to the major axis 52. Usually, the geometry illustrated in FIG. 6 has reduced efficiency and contrast compared to the one described in FIG. 5. However, for some applications this geometry can also be useful.

Figure 7:
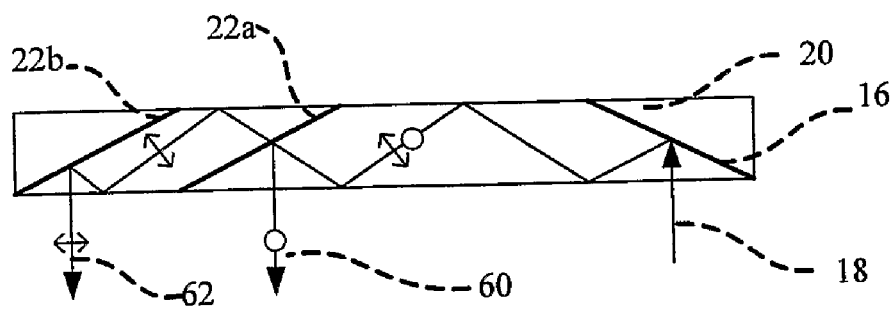

FIG. 7 illustrates an example of an LOE, exploiting wire grid polarizing beamsplitters as partially reflecting surfaces according to the present invention. The first reflecting surface 16 is illuminated by an unpolarized collimated display 18 emanating from a light source (not shown) located behind the device. The reflecting surface 16 reflects the incident light from the source such that the light is trapped inside the planar substrate 20 by total internal reflection. After several reflections off the surfaces of the substrate, the trapped light waves reach the first partially reflecting surface 22a, the major axis of which is oriented to reflect the s-polarized component 60 of the trapped light wave 18. The p-polarized component 62 is transmitted and then reflected by the second reflecting surface 22b, the major axis of which is oriented to reflect p-polarized light waves. Both the s-polarized 60 and the p-polarized 62 light waves are coupled out of the substrate into the eye of a viewer. Naturally, for this configuration, the polarization components of the input beam should be balanced. Hence, care must be taken to prevent birefringent effects from the collimating lens as well as in the substrate 20 itself.

Figure 8:
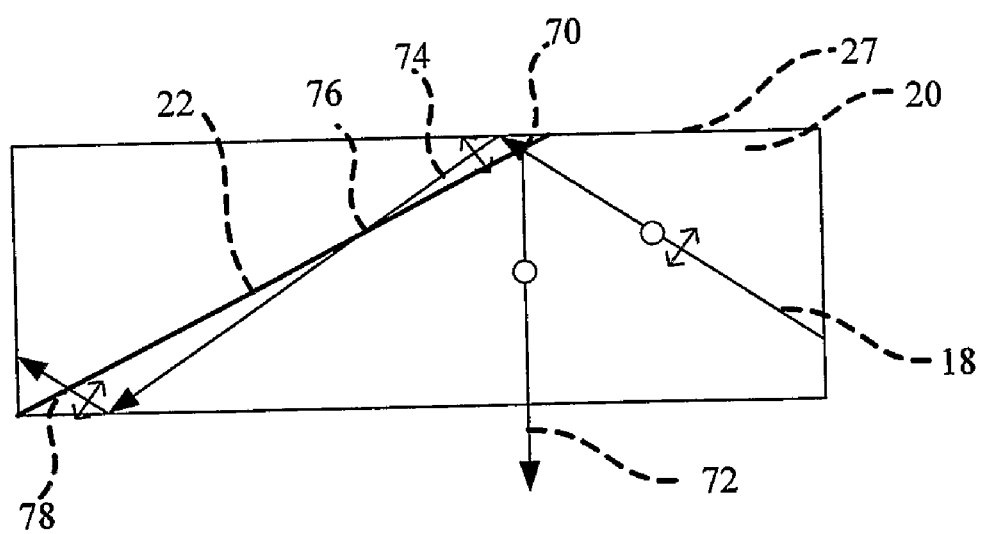

FIG. 8 is a detailed sectional view of the selectively reflective surface 22, which couples light trapped inside the substrate, out and into the eye of a viewer. As can be seen, in each cycle the coupled ray 18 passes through a reflecting surface 22 three times. At the first incident point 70, the s-polarized component 72 is reflected and coupled out of the substrate. The transmitted p-polarized component 74 is reflected off the upper surface 27 and then meets surface 22 again at the points 76 and 78, in between which it is again reflected off the opposite outer surface 27. However, at these two points, 76 and 78, the incident light is p-polarized, while the orientation of surface 22 is set to reflect s-polarized light and to transmit p-polarized light. Hence, the reflections at these points can be negligible, as required above, in relation to FIG. 2, in order to prevent undesired reflections and ghost images. Naturally, this can be valid not only for the example illustrated in FIGS. 7 and 8 but also in more general cases, wherein more than two partially reflecting surfaces are utilized to project the image into the eyes of a viewer.

Figure 9A:
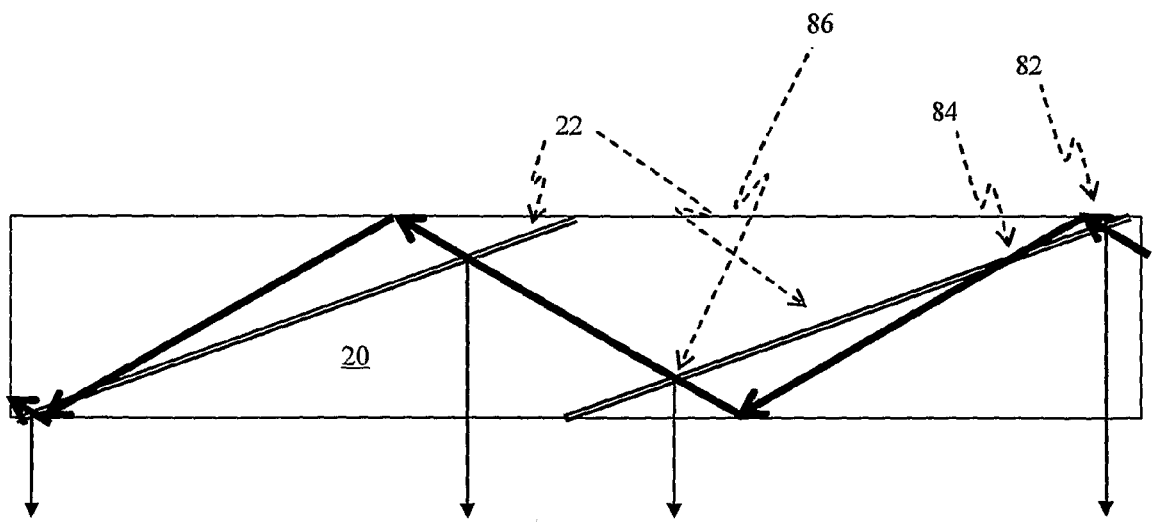
Figure 9B:
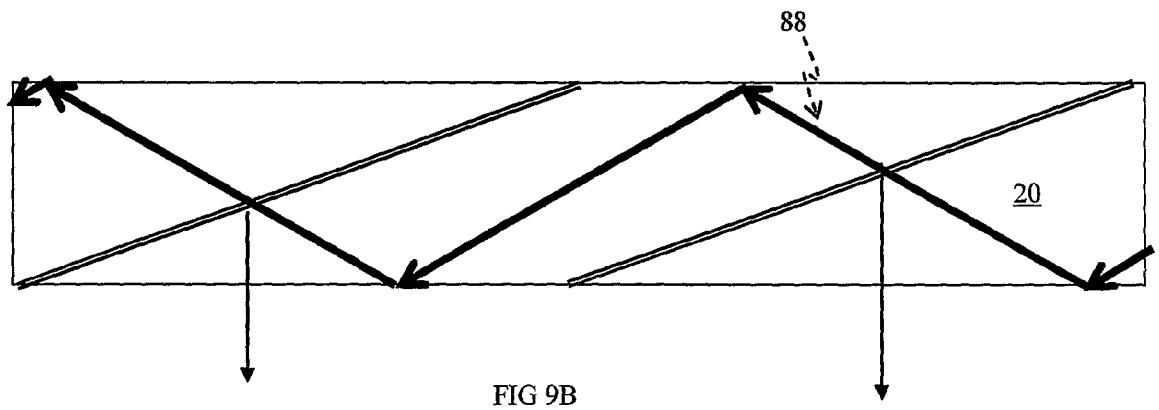

In both approaches presented here, an important issue that must be considered is the actual active area of each reflecting surface. A potential non-uniformity in the resulting image might occur due to the different reflection sequences of different rays that reach each selectively reflecting surface: some rays arrive without previous interaction with a selectively reflecting surface; other rays arrive after one or more partial reflections. This effect is illustrated in FIG. 9A for the first approach, utilizing thin film coatings on the partially reflecting elements. A ray intersects the first selectively reflecting surface 22 at the point 82. The incident angle of the ray is 25° and a portion of the ray's energy is coupled out of the substrate. The ray then intersects the same selectively reflecting surface at point 84 at an incident angle of 75° without noticeable reflection, and then intersects again at point 86 at an incident angle of 25°, where another portion of the energy of the ray is coupled out of the substrate. In contrast, the ray 88 shown in FIG. 9B, experiences only one reflection from the same surface. Further multiple reflections occur at smaller incident angles. It is difficult to fully compensate for such differences in multiple-intersection effects. Nevertheless, in practice, the human eye tolerates significant variations in brightness, which remain unnoticed. For near-to-eye displays, the eye integrates all of the light which emerges from a single viewing angle and focuses it onto one point on the retina, and since the response curve of the eye is logarithmic, small variations, if any, in the brightness of the display will not be noticeable. Therefore, even for moderate levels of illumination uniformity within the display, the human eye experiences a high-quality image. The required moderate uniformity can be readily achieved with an LOE. For displays located at a distance from the eye however, like head-up displays, the non-uniformity due to the multiple intersection effects cannot be tolerated. For these cases, a more systematic method to overcome the non-uniformity is required.

Figure 10:
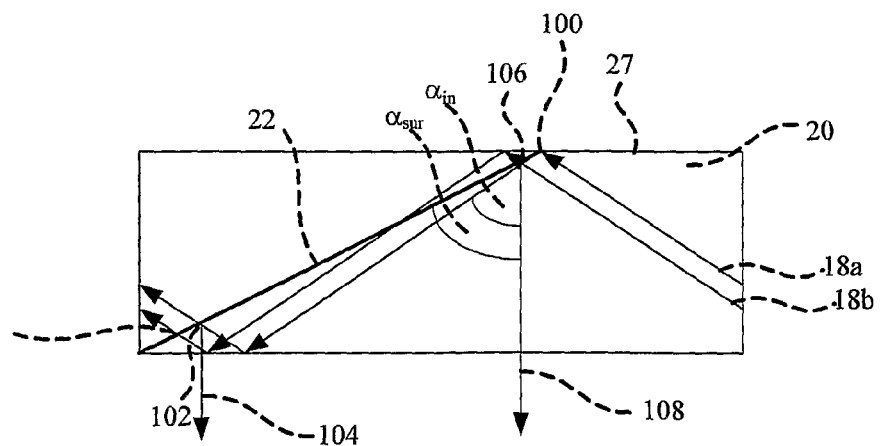

The non-uniformity issue is even more severe for the second approach, utilizing anisotropic partially reflecting elements. FIG. 10 illustrates a detailed sectional view of the selectively reflective surface 22, which couples light trapped inside the substrate out and into the eye of a viewer. As can be seen, the ray 18a is reflected off the upper surface 27, next to the line 100, which is the intersection of the reflecting surface 22 with the upper surface 26. Since this ray does not impinge on the reflecting surface 22, its polarization remains the same and its first incidence at surface 22 is at the point 102, after double reflection from both external surfaces. At this point, the light wave is partially reflected and the ray 104 is coupled out of the substrate. For other rays, such as ray 18b, which is located just below ray 18a, the first incidence at surface 22 is at point 106, before it meets the upper surface 26. Hence, when it is again incident on surface 22, at point 110 following double reflection from the external surfaces, the polarization of the ray is normal to that of the major axis of surface 22 and the reflectance there is negligible. As a result, all the rays with the same coupled-in angle as 18a that arrive at surface 22 left of the point 102, are not reflected there. Consequently, surface 22 is actually inactive left of the point 102 for this particular couple-in angle.

Since the inactive portions of the selectively reflecting surfaces 22 do not contribute to the coupling of the trapped light waves out of the substrate, their impact on the optical performance of the LOE can be only negative. That is, if there is no overlapping between the reflecting surfaces then there will be inactive optical portions in the output aperture of the system and "holes" will exist in the image. On the other hand, the inactive portions of the reflecting surfaces are certainly active with respect to the light waves from the external scene. In addition, the major axis orientation of two adjacent surfaces cannot be identical; otherwise the entire second surface will be inactive. Therefore, if overlapping is set between the reflective surfaces to compensate for the inactive portions in the output aperture then rays from the output scene that cross these overlapped areas will suffer from double attenuations and holes will be created in the external scene. This phenomenon significantly reduces the performance not only of displays, which are located at a distance from the eye like head-up displays, but that of near-eye displays also.

Figure 11:
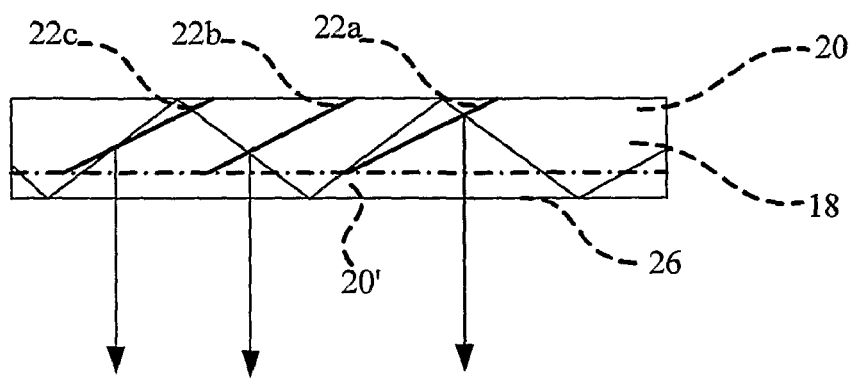

FIG. 11 illustrates a method of overcoming this problem. Only the active portions of the partially reflecting surfaces are embedded inside the substrate, that is, the reflecting surfaces 22 no longer intersect with the lower major surface 26, namely, terminate short of the surface 26. Since the ends of the reflecting surfaces are adjacent to one another over the length of the LOE, there will be no holes in the projected image, and since there is no overlap between the surfaces there will be no holes in the external view. There are several ways to achieve this, one of which is to attach a blank plate 20, preferably by optical cementing, to the active area of the substrate. In order to utilize only the active areas of the reflective surfaces 22, in the correct manner, it is important to calculate the actual active area of each reflective surface.

As illustrated in FIG. 12, the active aperture, $D_n$, of the reflective surface 22n in the place of the external surface, as a function of the coupled-in angle $\alpha_{in}$, is.

$$D_n = \frac{2d}{\cot(\alpha_{sur}) + \cot(\alpha_{in})} \quad (8)$$

Since the trapped angle $\alpha_{in}$ can be varied as a function of the FOV it is important to know with which angle to associate each reflecting surface 22n, in order to calculate its active aperture. FIG. 13 illustrates the active aperture as a function of field angle for the following system parameters; substrate thickness d=4 mm, substrate refractive index v=1.51, and reflective surface angle $\alpha_{sur}$=64°.

In consideration of the viewing angles, we note that different portions of the resulting image originate from different portions of the partially reflecting surfaces. FIG. 14, a sectional view of a compact LOE display system based on the proposed configuration, illustrates this effect. Here, a single plane light wave 112, representing a particular viewing angle 114, illuminates only part of the overall array of partially reflecting surfaces 22. Thus, for each point on the partially reflecting surface, a nominal viewing angle is defined, and the required active area of the reflecting surface is calculated according to this angle.

The exact, detailed design of the active area of the various partially reflective surfaces is performed as follows: For each particular surface, a ray is plotted (taking refraction, due to Snell's Law, into consideration) from the left edge of the surface to the center of the designated eye pupil 24. The calculated direction is set as the nominal incident direction and the particular active area is calculated according to that direction.

The exact values of the reflecting surfaces active areas can be used to determine the various distances between the reflecting surfaces 22. A larger active area dictates a larger inter-surface distance. However, more accurate calculations must be performed in order to determine exact distances between any two adjacent reflecting surfaces. FIG. 15 illustrates this issue. As explained above, the projection of each surface is adjacent to its neighbor so as to avoid either overlapping or gaps between the reflecting surfaces. This is true, however, for the central viewing angle only. For the right-most reflecting surface, there are gaps 116 between the right-most surfaces, whereas there is overlapping 118 between the left-most surfaces. Controlling the distances between each pair of adjacent surfaces 22 can solve this problem. That is, the inter-surface distances will be smaller for the right surfaces and larger for the left surfaces. As a result, this effect partially compensates the divergence in surface distances, which is described above with regards to active area sizes.

FIG. 16 illustrates the required distance between two adjacent surfaces as a function of the field angle for the same parameters as set above in reference to FIG. 13. As above, the detailed design of the distance between two adjacent reflecting surfaces is performed as follows: For each particular surface, a ray is plotted (taking refraction, due to Snell's Law, into consideration) from the left edge of the surface to the center of the designated eye pupil 24. The calculated direction is set as the nominal incident direction and the particular distance is calculated according to that direction. FIG. 17 illustrates an LOE 20 with reflecting surfaces 22 which have different active apertures and different distances between the partially reflecting surfaces and the lower major surface 26 of the substrate 20. In order to achieve the required structure, a wedged substrate (that is, wherein the two major surfaces are not parallel) can be constructed. A complementary blank wedged plate is attached to the substrate, preferably by optical cementing, in such a way that the combined structure forms a complete rectangular parallelepiped. That is, the two outer major surfaces of the final LOE are parallel to each other. Usually, the geometry presented in FIG. 17 is required for displays located at a distance from the eye only, like head-up displays, wherein the non-uniformity due to the multiple intersection effects cannot be tolerated, for systems with a large number of facets, or when the exact dimension of the overall output aperture is critical. For most systems, a simpler geometry, described in reference to FIG. 11, wherein the distance between the reflecting surfaces 22 and the lower surface 26 is constant, may be sufficient. Assuming, for example, an optical system of three reflecting surfaces with the same parameters as those described in reference to FIG. 12, and with an eye-relief (distance between the eye of a viewer and the LOE) of $R_{eye}$=30 mm, the calculated active areas of the surfaces 22a, 22b and 22c are 6.53 mm, 5.96 mm and 5.45 mm respectively, and the distances between these surfaces and the lower major surface 26 are 0.81 mm, 1.09 mm and 1.34 mm respectively. It is possible to fabricate a much simpler LOE having apertures of 6 mm for all three surfaces wherein the distances between the reflecting surfaces 22 and the lower major surface 26 are now 1.07 mm. The overall output aperture is smaller by 0.5 mm than for the optimal configuration, but the fabrication process is much simpler. Evidently, the left-most 0.5 mm of the third surface is not active, but this is of no consequence, since there is no overlap there.

So far it has been described how to fabricate the coupling-out active area of the LOB. However, one must note that it is important not only to couple the image out of the substrate without any distortion or ghost image, but also to couple the light into the substrate property. FIG. 18, which illustrates one method for coupling-in, presents a sectional view of the reflective surface 16, which is embedded inside the substrate 20 and couples light 18 from a display source (not shown) and traps it inside the substrate 20 by total internal reflection. As explained above, so as to avoid an image with gaps or stripes, it is essential that the trapped light covers the entire area of the LOE major surfaces. To ensure this, the points on the boundary line 120 between the edge of the reflective surface 16 and the upper surface 27 of the substrate 20 should be illuminated for a single light wave by the two extreme rays that enter the substrate from two different locations; a ray 18a, which illuminates the boundary line 120 directly, and another ray 18b, which is first reflected by the reflecting surface 16 and then by the lower surface 26 of the substrate, before illuminating the boundary line. In order to ensure that the two extreme rays 18a and 18b coincide after illuminating the boundary line 120 it is essential that the reflecting surface 16 intersects with the upper surface 27, which is opposite the input surface 26. The embodiment described above with regards to FIG. 18 is an example of a method for coupling input light waves into the substrate through one of the major surfaces of substrate. Input light waves can, however, be coupled into the substrate by other optical means as well, including (but not limited to) folding prisms, diffraction gratings, and other solutions. For all these other methods it is essential that one edge of the coupling-in element will intersect with one of the major surfaces in order to create a definite boundary line at which the two extreme rays of the input light waves can coincide. In conclusion, when adding the blank plate at one of the major surfaces of the LOB care must be taken that the added blank plate will not block the intersection between the coupling-in element and the major surface opposite to the input surface bf the LOB. Hence, the preferred surface to add the blank plate at is the input surface. Another important issue that must be verified in order to obtain a smooth image is the active aperture of the couple-in element. As illustrated in FIG. 18, in order to ensure that the two extreme rays 18a and 18b, of all of the light waves in the FOV of the system, indeed coincide, then the active aperture, $D_{in}$, of the surface 16 in the plane of the external surface 26 has to be at least:

$$D_n = d \cdot \frac{2d}{\cot(\alpha_{sur}) + \cot(\alpha_{max})}, \quad (9)$$

wherein $\alpha_{max}$ the maximal angle in the FOV of the system. Apparently, if a blank plate is added at the input surface' of the LOB then for a given LOB thickness d the active aperture of surface 16 is reduced accordingly. Therefore, it is important to verify that the active aperture will not be smaller then value given in Eq. (9).

The solution which is described above in reference to FIGS. 11 to 17 is applicable for both approaches, however, there is a major difference between these two approaches if we want to expand this solution. Up to now, the solution where the blank plate (either wedged or not) is added at the lower surface of the LOE has been discussed, i.e., the blank plate is attached to the output surface of the system. There are occasions, however, where it is preferable to add the blank plate at the opposite surface of the LOE. FIG. 19 illustrates an optical system wherein the input light waves 18 enter the LOE through the upper surface 27. Therefore, as explained above in reference to FIG. 18, surface 16 must intersect with the lower surface 26. However, adding a blank plate over the entire aperture of the lower surface 26 in this configuration would eradicate the required intersection between surfaces 16 and 26. Hence, the blank plate must be added at the opposite surface 27 or an alternative solution must be found.

FIG. 20 illustrates an LOE wherein a blank plate 20' is added at the upper surface, assuming an on-axis input light wave and the same parameters as defined above in reference to FIG. 2. The first potential intersection of the coupled ray 18 with the first reflecting surface 22a is avoided as a result of the blank plate 122. The ray is reflected from the upper surface 27 and then intersects the same reflecting surface 22a at point 124 at an incident angle of 75° wherein noticeable reflection is required. It then intersects the reflecting surface again at point 126 at an incident angle of 25°, where a portion of the energy of the ray must be coupled out of the substrate. Clearly, there is a distinct difference here between the performance in the two solutions proposed. In the angular selective thin film coating solution, the reflectance depends on the incident angle of the incoming ray only. Hence, the reflectance of the first incidence 124, being at a large angle, is negligible, wherein the reflectance of the second incidence, being at the designated angle of 25°, is as designed. Therefore, the performance in this situation is as required. In the second solution, however, utilizing anisotropic partially reflecting elements, the reflectance does not depend on the incident angle but rather on the order of the various incidences. That is, at the first incidence the ray is partially reflected wherein at the following incidences with the same reflecting surface the reflectance is negligible. Hence, there is a noticeable reflectance here at the first incidence 124 and a negligible reflectance at the second incidence 126, in contrary to the required behavior of the reflecting surface. As a result, it is possible to add the blank plate 20' at the opposite surface of the output surface only in an LOE based on angular sensitive coating and not in an LOE based on anisotropic partially reflecting elements.

FIG. 21 illustrates a method, applicable to each of the approaches described above, in reference to FIGS. 13 and 17, of attaching at step (a) a blank plate 132 to one of the major surfaces of the substrate 130, preferably using optical cement, so as to yield at (b) an LOE 134 with the appropriate active apertures for all of the reflecting surfaces. In order to materialize the LOE illustrated in FIG. 17, both the substrate 130 and the blank plate 132 have a wedge structure. In that case it is usually required that the two external major surfaces, 136 and 138, be parallel to each other in such a way that the combined structure from a complete rectangular parallelepiped.

FIG. 22 illustrates another method of fabricating the array of partially reflecting surfaces at step (a). Two similar, tooth-shaped transparent forms 140 are fabricated by injection-molding or casting. The required reflecting surfaces 142 (either anisotropic or coated thin-film) are inserted in the appropriate places between the forms 140 and the two forms are then glued together at (b) to create the required LOE 144. As illustrated above, with reference to FIG. 20, it is required for LOEs based on anisotropic reflecting surfaces to remove or thin down the upper blank portion of the LOE, in order to enable the reflecting surfaces to intersect the upper surface of the LOE.

FIG. 23 illustrates yet another version of the method described in FIG. 22 for fabricating the array of partially reflecting surfaces. Instead of inserting the reflecting surfaces 142 at step (a), the surfaces are applied to a very thin and flexible polymer sheet 146. The sheet 146 is inserted in step (b) between forms 140, which are then cemented together to create the requested LOE.

The fabrication methods described above with reference to FIGS. 21 to 23 are not applicable to an LOE based on anisotropic reflecting surfaces with the geometry illustrated in FIG. 19 wherein the input surface 27 is opposite to the output surface 26. On one hand, it is not possible to add the blank plate at the upper surface 27 as explained above in reference to FIG. 20. On the other hand, it is not possible to add the blank plate over the entire aperture of the lower surface 26, which is opposite to the input surface 27, as explained above in reference to FIG. 19. A possible way to fabricate the required LOE is illustrated in FIG. 24. At the first step (a), two different parts, which include the coupling-out 148 and the couple-in 150 portions, are fabricated separately. At the second step (b) the two portions are attached together at their peripheral sides to materialize the complete LOE form 20.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical device, comprising:
a light-transmitting substrate having at least two major surfaces and edges, a plurality of partially reflecting surface carried by the substrate, the partially reflecting surfaces being parallel to each other and not parallel to any of the edges of the substrate with at least one of the partially reflecting surfaces not intersecting at least one of the two major surfaces; and
optical means with an active input aperture for coupling light waves from a display source into the substrate by total internal reflection, the optical means intersecting with at least one of the two major surfaces of the substrate, the active input aperture being sufficiently large and illuminated by light waves from the display source so that a single point on the boundary line between the edge of the optical means and one of the major surfaces of the substrate is illuminated by two different rays from one of the light waves from the display source entering the substrate at two different locations.

2. The optical device according to claim 1, wherein said two major surfaces are parallel.

3. The optical device according to claim 1, further comprising means for producing image light waves coupled by said optical means into said substrate by total internal reflection.

4. The optical device according to claim 3, wherein said means for producing image light waves is located next to one of said two major, surfaces acting as the input surface of the substrate.

5. The optical device according to claim 3, wherein said means for producing image light waves comprises a display source and an imaging lens.

6. The optical device according to claim 5, wherein said imaging lens is a collimating lens.

7. The optical device according to claim 1, wherein said plurality of partially reflecting surfaces couples the light waves trapped by total internal reflection out of said substrate through one of said major surfaces acting as the output surface of the substrate.

8. The optical device according to claim 1, wherein said one major surface which does not intersect with at least one of said partially reflecting surfaces, is the input surface.

9. The optical device according to claim 1, wherein said one major surface which intersects with said optical means is located opposite to the input surface.

10. The optical device according to claim 1, wherein at least one of said partially reflecting surfaces is coated with thin-film angular-sensitive material.

11. The optical device according to claim 1, wherein at least one of said partially reflecting surfaces is an anisotropic surface.

12. The optical device according to claim 11, wherein said at least one anisotropic surface has a major axis parallel to the surface plane characterized in that the reflection and transmission properties of the surface substantially depend on the orientation of the polarization of the incident light wave in relation to the major axis of the surface.

13. The optical device according to claim 12, wherein said anisotropic surface reflects the incident light waves with its electrical field vector parallel to said major axis and transmits incident light waves with its electrical field vector perpendicular to said major axis.

14. The optical device according to claim 11, wherein said anisotropic partially reflecting surface is a wire grid polarizing beamsplitter.

15. The optical device according to claim 14, wherein said wire grid polarizing beamsplitter comprising an array of thin parallel conductors supported by a transparent substrate, characterized in that the major axis of the wire grid polarizing beamsplitter is parallel to the array of conductors.

16. The optical device according to claim 1, wherein said major surface which does not intersect with at least one of said partially reflecting surfaces located opposite said one major surface which intersects with said optical means.

17. The optical device according to claim 1, wherein the distance between said major surface which does not intersect with at least one of said partially reflecting surfaces and said partially reflecting surfaces, is constant.

18. The optical device according to claim 1, wherein the distance between said major surface which does not intersect with at least one of said partially reflecting surfaces and said partially reflecting surfaces is changed gradually.

19. The optical device according to claim 1, wherein said substrate is composed of a plurality of transparent forms created by injection molding techniques.

20. The optical device according to claim 1, wherein said partially reflecting surfaces are composed of thin transparent plates.

21. The optical device according to claim 1, wherein said anisotropic partially reflecting surfaces are composed of flexible transparent sheet portions coated with optical coatings.

22. The optical device according to claim 1, wherein one of the two rays directly illuminates the boundary line and the second of the rays is reflected by the other of the major surfaces of the substrate prior to illuminating the boundary line.

23. An optical device, comprising:
- a light-transmitting substrate having at least a first and a second major surface and edges, a plurality of partially reflecting surfaces carried by the substrate, the partially reflecting surfaces being parallel to each other and not parallel to any edge of the substrate with all of the partially reflecting surfaces intersecting the first and second major surfaces;
- optical means with an active input aperture for coupling light from a display source into said substrate by total internal reflection, the optical means intersecting with at least one of the first and second major surfaces, the active input aperture of the optical means being sufficiently large and illuminated by the light waves from the display source so that a single point on the boundary line between the edge of the optical means and one of the two major surfaces of the substrate is illuminated by the different rays from one of the light waves for the display source that enters the substrate in two different locations; and
- a light transmitting plate having at least two major surfaces, one of the major surfaces being attached to one of the first or second major surfaces of the substrate.

24. The optical device according to claim 23, wherein one of the first or second major surfaces, of the first substrate is non-parallel to the other major surface of the substrate.

25. The optical device according to claim 24, wherein one of the major surfaces of the substrate is attached to one of the major surfaces of the light transmitting plate and wherein the other surface of the substrate is parallel to the other surface of the plate.

26. The optical device according to claim 23, wherein the plate is optically cemented to said substrate.

* * * * *